United States Patent [19]
Lachmann

[11] 3,748,698
[45] July 31, 1973

[54] CONNECTING ELEMENT FOR CONNECTING TWO ENDS OF A CONVEYOR BELT

[75] Inventor: Hans-Peter Lachmann, Cologne, Germany

[73] Assignee: Precismeca Gesellschaft fur Fordertechnik mbH, Sulzbach/Saar, Germany

[22] Filed: Aug. 2, 1971

[21] Appl. No.: 168,281

[30] Foreign Application Priority Data
Aug. 10, 1970 Germany.................P 20 39 608.1

[52] U.S. Cl. .................................. 24/38, 74/231 J
[51] Int. Cl. ............................................. F16g 3/00
[58] Field of Search ...................... 74/231 J, 237; 24/33 A, 38, 31 B, 31 C, 31 W

[56] References Cited
UNITED STATES PATENTS

| | | | |
|---|---|---|---|
| 271,010 | 1/1883 | Wilkins | 24/31 B |
| 983,712 | 2/1911 | Heinel | 24/31 B |
| 1,259,360 | 3/1918 | Cerpial | 24/31 B |
| 1,267,325 | 5/1918 | Krzyworzycki | 24/31 B |
| 1,605,950 | 11/1926 | Hohl | 24/31 B |
| 1,653,624 | 12/1927 | Gingras | 74/231 J UX |
| 2,122,052 | 6/1938 | Bell | 74/231 J |
| 2,566,262 | 8/1951 | Traxler | 74/237 |
| 1,421,036 | 6/1922 | Snyder | 24/31 B |
| 56,767 | 7/1866 | Leas | 24/33 A |

FOREIGN PATENTS OR APPLICATIONS

| | | | |
|---|---|---|---|
| 124,508 | 4/1919 | Great Britain | 24/38 |

*Primary Examiner*—Donald A. Griffin
*Attorney*—Walter Becker

[57] ABSTRACT

A connector arrangement for mounting on belt ends to form an endless belt. The belt has tension elements in the form of wires or cables therein. The connector arrangement has bendable legs to receive the belt ends with spikes thereon adapted to be driven into, or through, the respective belt end.

15 Claims, 11 Drawing Figures

Inventor:
Hans-Peter Lachmann

CONNECTING ELEMENT FOR CONNECTING TWO ENDS OF A CONVEYOR BELT

The present invention relates to a connecting element for connecting two ends of a conveyor belt of rubber or of another material with wires or cables extending in the longitudinal direction of the belt and forming a pull-resistant insert means, and more specifically, concerns a connecting element for belts of the above mentioned type which will not permit the employment of insert means for hook connectors in the connecting zone.

It is an object of the present invention to provide a connecting element of the above mentioned general type which will make it possible to increase the life thereof and the life of the belt connection.

It is another object of this invention to provide a belt connection which will permit the driving of clamps with spikes into the belt ends to be interconnected.

This object and other objects and advantages of the invention will appear more clearly from the following specification, in connection with the accompanying drawings, in which.

Figure 1:
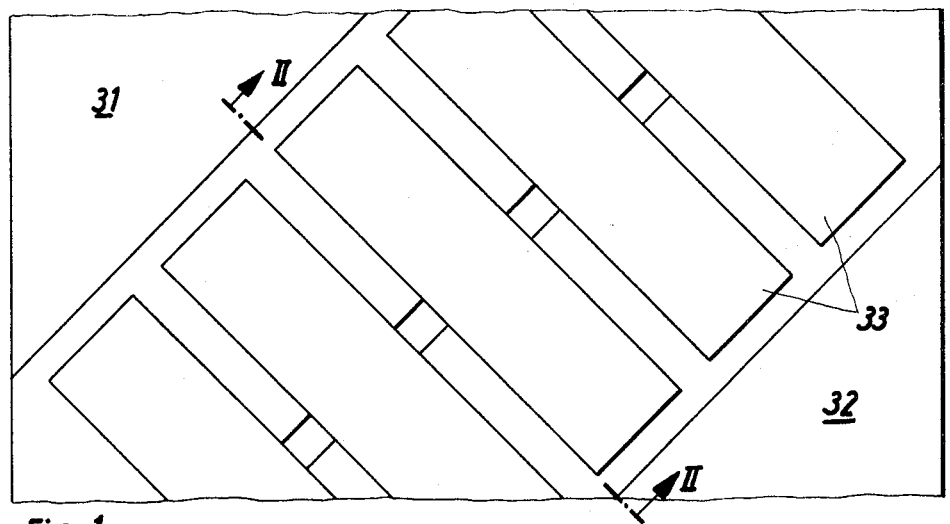
FIG. 1 is a diagrammatic illustration of a top of a conveyor belt connection according to the invention.

The connecting element according to the present invention for connecting two ends of a conveyor belt of rubber or similar material with longitudinally extending wires or cables form a pull-resistant insert, which connecting element in the connecting zone, is free from inserts permitting the employment of hook connectors for carrying out a method according to which spike-equipped clamps are inserted into the belt ends is characterized primarily in that the said clamps are entirely or partially bendable. In view of this bendability of the clamps it will be assured that the alternating bending stresses to which the wires or cables are subjected within the region of the area adjacent to the connecting element when said belt moves over drums and supporting rollers, will be considerably reduced, and in particular due to the enlargement of the bending radius of the wires or cables in said region and the widening of the zone in which said stresses occur.

The clamps may extend over both conveyor belt ends, or the conveyor belt ends may comprise separated clamps which are interconnected by a coupling. Expediently, the coupling is at least partially flexible. In view of the bendability of the coupling, the wear at the contact areas between the individual parts of the coupling and the connecting element will be considerably reduced. The bendability or flexibility can be obtained in a most simple manner by making the clamps and/or the coupling means in the form of a plurality of layers at least one of which is bendable. The bendable layers may consist, for instance, of spring steel sheets.

According to a further development of the invention, the bendable layers have different length so that any desired stepping of the supporting force of the connecting elements upon the conveyor belt can be realized.

A further feature of the invention consists in that those ends of the layers which face the conveyor belt and which form the clamps are bent in the direction toward the central plane of the conveyor belt. This feature is advantageous particularly when the stresses acting upon the conveyor belt and exerting grinding or scratching stresses are particularly high.

According to a further development of the invention, with a conveyor belt produced with the connecting elements of the invention, the connecting elements are by at least an endless cable or the like interconnected, which cable or the like is clamped in between the coupling and the upper and lower clamp section and passed through the conveyor belt ends so that with the impact stresses to which an individual connecting element is subjected, the adjacent connecting elements will take over a portion of said stresses. The cable furthermore brings about that the connecting elements on the belt edges cannot be torn off when the conveyor belt laterally hits an abutment or a handicap. In addition thereto, the cable brings about a pull stress which extends at an angle of 90° to the pull stress of the connecting elements so that the joint will be considerably improved.

Figure 2:
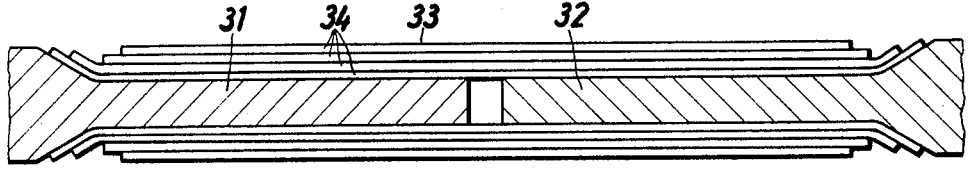
FIG. 2 illustrates a section taken along the line II—II of FIG. 1, but on a scale larger than that of FIG. 1.

Referring more specifically to FIGS. 1 and 2, the conveyor belt connection illustrated therein comprises the belt ends 31 and 32 which are interconnected by brackets 33. The brackets or clamps 33 consist of steel sheet metal 34 and comprise pins (not illustrated) which are hammered into the conveyor belt ends 31 and 32.

Figure 3:
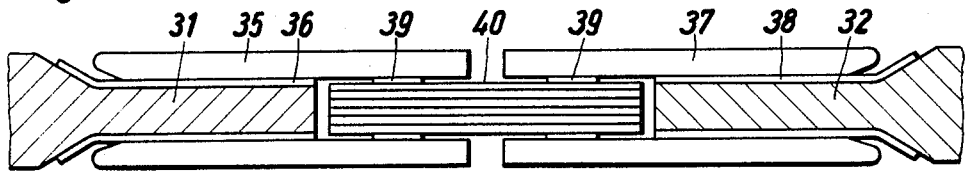
FIG. 3 represents a section similar to that of FIG. 2 through a modified conveyor belt connection according to the invention.

With the embodiment of FIG. 3, the conveyor belt ends 31 and 32 have separate clamps which respectively are formed of two layers 35 and 36; 37 and 38, said layers 36, 38 consisting of spring steel sheet metal. The layers 35 of the conveyor belt end 31 and the layers 37 of the conveyor belt end 32 are interconnected by bolts 39 and a coupling 40. The coupling 40 is composed of six layers of spring steel sheet metal.

Figures 4, 5:
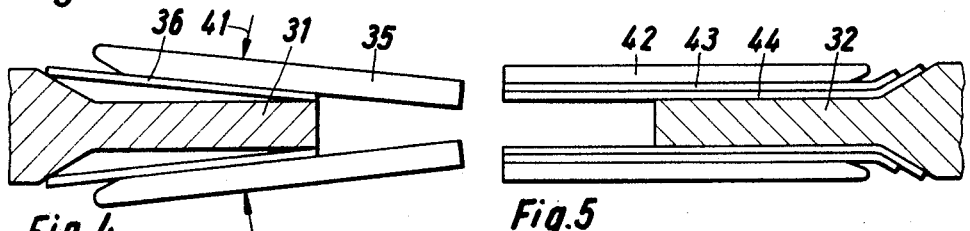
FIG. 4 shows the left-hand conveyor belt end of FIG. 3 with the pertaining clamp during assembly.
FIG. 5 illustrates the right-hand conveyor belt end of a modified conveyor belt connection.

From FIG. 4 there will be seen how the layers 35 and 36 are placed against the conveyor belt end 31 in order to be pressed in the direction of the arrows 41. Layers 36 adapt themselves to the shape of the conveyor belt end 31.

Conveyor belt end 32 is, in conformity with FIG. 5, provided with a clamp each of which is formed of two layers 42, 43 and 44. The layers 43 and 44 consist of spring steel sheet metal.

Figures 6, 7:
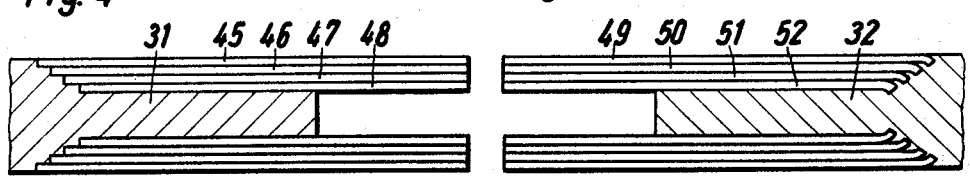
FIG. 6 illustrates the left-hand conveyor belt of still another conveyor belt connection.
FIG. 7 shows the right-hand conveyor belt end of still another conveyor belt connection.

With the embodiments of FIGS. 6 and 7, the brackets or clamps each comprise two layers 45, 46, 47 and 48 (FIG. 6), or of two layers each, namely, 49, 50, 51 and 52 (FIG. 7).

The layers forming the clamps may have different lengths (FIGS. 2 to 7). The ends of the layers may, in conformity with the shape of the conveyor belt ends be bent upwardly (FIGS. 2 to 5) and may extend straight over the entire length (FIG. 6) or may be bent in the direction toward the central plane of the conveyor belt (FIG. 7).

Figure 8:
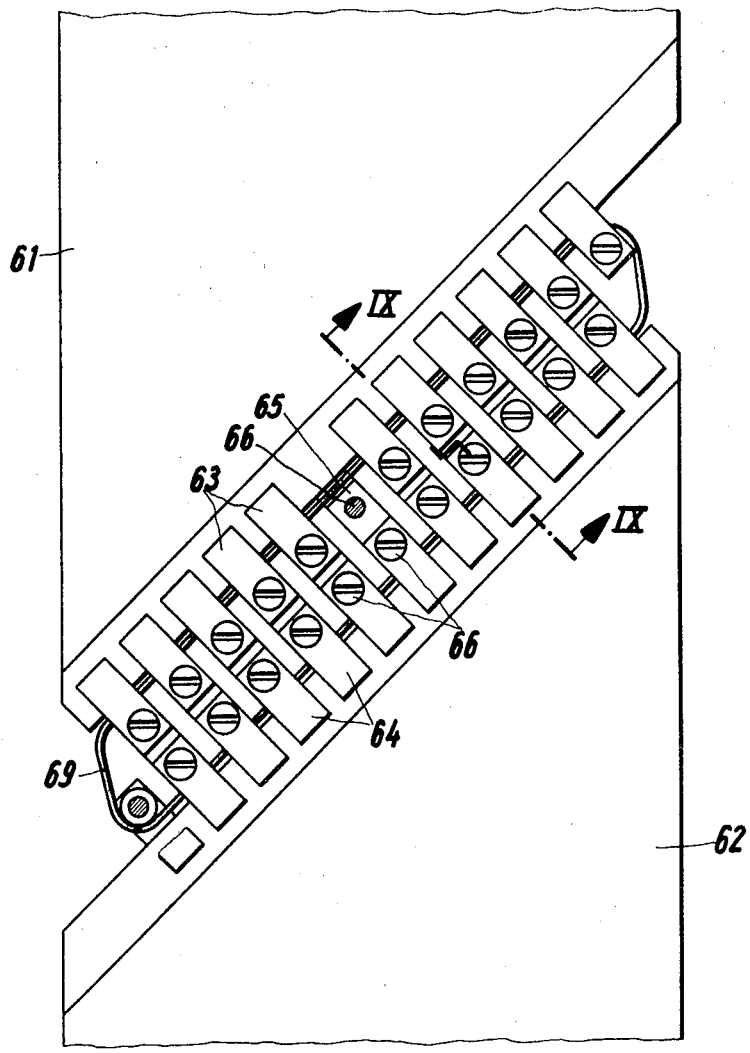
FIG. 8 is a top view of another modified conveyor belt connection.
Figure 9:
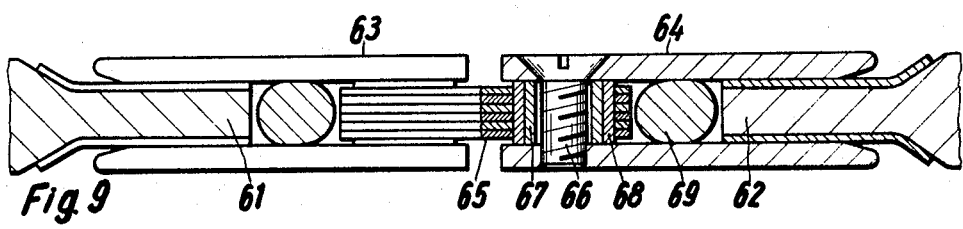
FIG. 9 represents a section taken along the line IX—IX of FIG. 8, but on a larger scale than that of FIG. 8.

The belt connection illustrated in FIGS. 8 and 9 comprises conveyor belt ends 61 and 62 into which have been hammered the clamps 63, 64, which are provided with non-illustrated pins. Between the clamps 63 and 64 there is provided a coupling 65 which by means of bolts 66 interconnects the clamps 63 and 64. Each clamp 63 and 64 is interconnected by means of bolts 66. Each bolt 66 is passed through a bushing 67 having a mandrel 68 of elastic material. Between the conveyor belt ends 61 and 62 on one hand and the coupling 65 on the other hand, there is provided or passed through an endless cable 69 which is clamped between the sections of the clamps 63 and 64.

Figure 10:
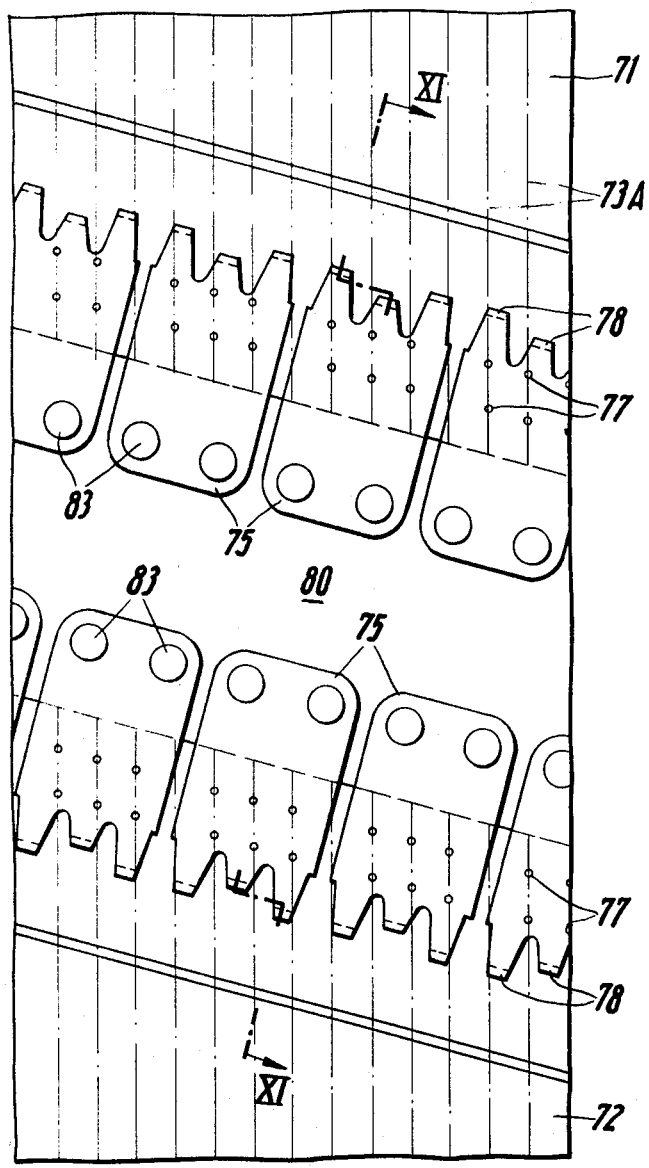
FIG. 10 is a top view of still another conveyor belt connection of the invention.
Figure 11:
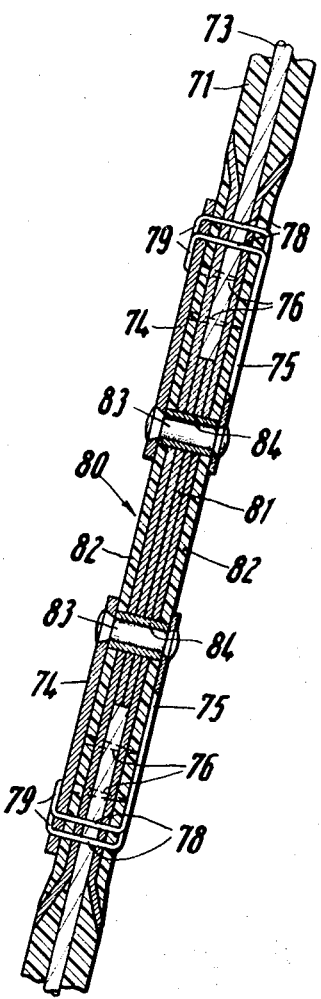
FIG. 11 represents a section taken along the line XI—XI of FIG. 10.

The conveyor belt connection according to FIGS. 10 and 11 comprises conveyor belt ends 71 and 72, the thickness of which, at the outer ends is reduced to approximately the diameter of cable 73 serving as pull-resistant insert. Inasmuch as the cables 73 in FIG. 10 are not visible, they have their central axes 73a indicated in the drawings by dot-dash lines. Clamps consisting of two parts 74 and 75 have been hammered into the conveyor belt ends 71 and 72. The clamp portions 74 have spikes 76, the length of which corresponds approximately to the thickness of the conveyor belt within the region of the connecting area or joint. In order to permit the spikes 76 to penetrate the clamp portions 75, the latter are at the respective areas provided with bores 77. The spikes 76 are so arranged that they penetrate approximately through the central axes 70a of the cables 73.

The clamp portions 75 have spikes 78, the length of which is considerably greater than the thickness of the conveyor belt so that the ends 79 of the spikes 78 have to be bent over whereby the clamp portions 74 and 75 are firmly anchored with each other and with the conveyor belt ends 71 and 72.

The connection of the conveyor belt ends 71 and 72 is established by a coupling 80 formed by a multi-layer fabric 81 and two plates 82. The plates 82 are made of the same material as the conveyor belt. With the embodiment according to FIG. 11, the fabric 81 has four layers. The two inner layers of the fabric are cut out to such an extent that the portion of the conveyor belt ends 71 and 72, the thickness of which is reduced to approximately the diameter of the cables 73, will fit itself precisely into the coupling 80.

The coupling 80 is, by rivets 83, connected to the clamp portions 74 and 75 while the rivets 83 are passed through bushings 84 inserted into the coupling 80.

It is, of course, to be understood that the present invention is, by no means, limited to the particular showing in the drawings, but also comprises any modifications within the scope of the appended claims.

What is claimed is:

1. In a connecting element for interconnecting the opposed ends of a belt of flexible material housing longitudinally extending tension inserts, such as exclusively steel cables, thereon: a clamp member having legs at one end adapted to receive a belt end therebetween, and spike means on at least one of said legs adapted to be hammered into said belt near the end, said clamp being formed of bendable material, at least some of said spike means extending into central axes of said cables and at least some of said spike means being located between said cables.

2. A connecting element according to claim 1 which includes a pair of the said clamp members separately connected to belt ends, a bendable coupling joining said clamp members at the ends thereof opposite the ends connected to said belt ends, and at least one endless cable extending therethrough and clamped in between said clamp members.

3. A connecting element according to claim 1 in which at least some of said spike means extend completely through said belt.

4. In a connecting element for interconnecting the opposed ends of a belt of flexible material housing longitudinally extending tension inserts, such as wires or cables, thereon: a clamp member having legs at one end adapted to receive a belt end therebetween, spike means on at least one of said legs adapted to be hammered into said belt near the end, said clamp being formed of bendable material, there being a pair of the said clamp members and a coupling joining said clamp members at the ends thereof opposite the ends connected to said belt ends, and an endless cable extending through said legs and interposed between the said belt ends and said coupling.

5. A connecting element according to claim 4 in which said clamp member has legs at both ends each adapted to receive a respective belt end and each having spikes adapted to be driven into the respective belt end.

6. A connecting element according to claim 4 in which said coupling is bendable.

7. A connecting element according to claim 4 in which at least said coupling comprises superimposed layers of sheet metal.

8. A connecting element according to claim 7 in which said layers of sheet metal are of different lengths.

9. A connecting element according to claim 8 in which at least a pair of said layers form said legs and at the ends are bent away from the plane of the belt connected thereto.

10. A connecting element according to claim 4 in which said coupling is in the form of a plurality of layers of fabric.

11. A connecting element according to claim 10 in which said coupling is about as strong as the belt on which said clamp members are mounted.

12. A connecting element according to claim 10 in which the coupling includes layers on the exposed faces of substantially the same material as that of the belt on which said clamp members are mounted.

13. A connecting element according to claim 10 in which said coupling at the ends is reduced in thickness, and said belt ends in the region engaged by said clamp members also being reduced in thickness whereby said belt presents substantially uniform thickness throughout the length thereof.

14. A connecting element according to claim 13 in which outer layers of said coupling extend over opposite faces of each belt end and are adhesively connected thereto.

15. A connecting element according to claim 4 in which at least some of said spike means extend into the belt at least to the central axes of said tension inserts.

* * * * *